United States Patent
Vela

(10) Patent No.: US 11,112,118 B2
(45) Date of Patent: Sep. 7, 2021

(54) GAS TURBINE LOWER HEATING VALUE METHODS AND SYSTEMS

(71) Applicant: GENERAL ELELCTRIC COMPANY, Schenectady, NY (US)

(72) Inventor: Veronica Elizabeth Vela, Queretarto (MX)

(73) Assignee: General Electric Company, Schenectady, NY (US)

( * ) Notice: Subject to any disclaimer, the term of this patent is extended or adjusted under 35 U.S.C. 154(b) by 379 days.

(21) Appl. No.: 15/194,218

(22) Filed: Jun. 27, 2016

(65) Prior Publication Data
US 2017/0370297 A1 Dec. 28, 2017

(51) Int. Cl.
| | |
|---|---|
| F23R 3/36 | (2006.01) |
| F02C 9/00 | (2006.01) |
| F02C 7/143 | (2006.01) |
| F02C 9/28 | (2006.01) |
| F23N 1/00 | (2006.01) |
| F23R 3/14 | (2006.01) |

(52) U.S. Cl.
CPC ............... *F23R 3/36* (2013.01); *F02C 7/143* (2013.01); *F02C 9/00* (2013.01); *F02C 9/28* (2013.01); *F23N 1/002* (2013.01); *F23R 3/14* (2013.01); *F05D 2220/75* (2013.01); *F05D 2270/71* (2013.01); *F23N 2221/10* (2020.01); *F23N 2223/40* (2020.01); *F23N 2241/20* (2020.01)

(58) Field of Classification Search
CPC .... F23R 3/14; F23R 3/36; F02C 7/143; F02C 9/00; F02C 9/28; F23N 1/002
See application file for complete search history.

(56) References Cited

U.S. PATENT DOCUMENTS

| | | | | | |
|---|---|---|---|---|---|
| 2,678,531 | A | * | 5/1954 | Miller | F01K 21/047 60/39.17 |
| 4,094,747 | A | * | 6/1978 | Pfenninger | C02F 1/16 202/173 |
| 4,359,284 | A | * | 11/1982 | Kude | G01N 33/0013 204/407 |
| 4,448,018 | A | * | 5/1984 | Sayama | F01K 21/047 60/39.511 |

(Continued)

OTHER PUBLICATIONS

Sanjay, Singh, Prasad, "Thermodynamic Evaluation of Combined Cycle Using Different Methods of Steam Cooling," PWR2004-52152, Mar. 2004 (Year: 2004).*

(Continued)

*Primary Examiner* — Scott J Walthour
*Assistant Examiner* — David P. Olynick
(74) *Attorney, Agent, or Firm* — Fletcher Yoder, P.C.

(57) ABSTRACT

A control system for a gas turbine includes a controller. The controller includes a processor configured to receive a plurality of signals comprising a temperature signal, a pressure signal, a speed signal, a mass flow signal, or a combination thereof, from sensors disposed in the gas turbine system. The processor is further configured to apply the plurality of signals as input to a heating value model. The processor is also configured to execute the heating value model to derive a heating value for a fuel combusted by the gas turbine system. The processor is additionally configured to control operations of the gas turbine system based on the heating value for the fuel.

14 Claims, 3 Drawing Sheets

(56) References Cited

U.S. PATENT DOCUMENTS

| | | | | | |
|---|---|---|---|---|---|
| 4,896,499 | A | * | 1/1990 | Rice | F01D 5/185 60/39.182 |
| 5,435,122 | A | * | 7/1995 | Ahlin | F01K 23/062 60/39.12 |
| 5,553,448 | A | * | 9/1996 | Farrell | F02C 3/10 29/401.1 |
| 5,743,079 | A | * | 4/1998 | Walsh | F02C 9/28 60/39.281 |
| 5,832,714 | A | * | 11/1998 | Hines | F02C 7/143 60/774 |
| 6,003,298 | A | * | 12/1999 | Horner | F01D 17/145 60/39.182 |
| 6,012,279 | A | * | 1/2000 | Hines | F02C 7/1435 60/39.53 |
| 6,226,976 | B1 | * | 5/2001 | Scott | F02C 9/28 60/39.281 |
| 6,553,753 | B1 | * | 4/2003 | Payling | F01K 21/047 60/39.53 |
| 7,284,377 | B2 | * | 10/2007 | Joshi | F02C 3/305 60/39.55 |
| 7,565,805 | B2 | * | 7/2009 | Steber | F23N 5/003 60/39.281 |
| 9,003,764 | B2 | * | 4/2015 | Thacker | F02C 6/00 122/7 B |
| 9,297,315 | B2 | * | 3/2016 | Simons | F02C 9/16 |
| 10,041,373 | B2 | * | 8/2018 | Vela | B08B 9/093 |
| 2002/0078689 | A1 | * | 6/2002 | Coleman | F02C 3/13 60/728 |
| 2004/0037697 | A1 | * | 2/2004 | Sanborn | F02C 9/00 415/118 |
| 2004/0055273 | A1 | * | 3/2004 | Hirayama | F02C 9/28 60/39.281 |
| 2004/0244380 | A1 | * | 12/2004 | Stegmaier | F01D 15/005 60/772 |
| 2004/0255595 | A1 | * | 12/2004 | Morgan | F02C 9/28 60/773 |
| 2005/0086939 | A1 | * | 4/2005 | Schmid | F01D 13/003 60/726 |
| 2005/0160736 | A1 | * | 7/2005 | Reale | A63B 71/0605 60/772 |
| 2007/0118253 | A1 | * | 5/2007 | Dahler | F23N 5/022 701/1 |
| 2007/0144176 | A1 | * | 6/2007 | Joshi | F02C 7/143 60/728 |
| 2008/0072577 | A1 | * | 3/2008 | Taylor | F01D 25/32 60/295 |
| 2008/0183362 | A1 | * | 7/2008 | Dooley | F02C 3/20 701/100 |
| 2008/0243352 | A1 | * | 10/2008 | Healy | F01D 17/00 701/100 |
| 2009/0211252 | A1 | * | 8/2009 | Tani | F01K 7/345 60/645 |
| 2010/0024536 | A1 | * | 2/2010 | Adibhatla | G05B 17/02 73/112.01 |
| 2010/0058801 | A1 | * | 3/2010 | Masani | F01D 15/005 62/611 |
| 2011/0052370 | A1 | * | 3/2011 | Karpman | F01D 21/003 415/13 |
| 2011/0054704 | A1 | * | 3/2011 | Karpman | F02C 9/28 700/282 |
| 2011/0077783 | A1 | * | 3/2011 | Karpman | G05B 17/02 700/283 |
| 2011/0094241 | A1 | * | 4/2011 | Rodd | F01D 19/00 60/778 |
| 2012/0023953 | A1 | * | 2/2012 | Thomas | F02C 7/228 60/772 |
| 2012/0036861 | A1 | * | 2/2012 | Seely | F02C 9/28 60/776 |
| 2013/0042624 | A1 | * | 2/2013 | Botarelli | F02C 9/00 60/772 |
| 2013/0192249 | A1 | * | 8/2013 | Widener | F02C 7/232 60/782 |
| 2013/0230412 | A1 | * | 9/2013 | Alamaki | F02C 6/06 417/53 |
| 2014/0018973 | A1 | * | 1/2014 | Drohan | F02C 9/00 700/300 |
| 2014/0260309 | A1 | * | 9/2014 | Menon | F23R 3/36 60/780 |
| 2015/0298024 | A1 | * | 10/2015 | Watkins | B01D 3/146 203/24 |
| 2015/0308293 | A1 | * | 10/2015 | Huntington | F02C 3/34 60/772 |
| 2015/0315978 | A1 | * | 11/2015 | Davies | F02C 9/40 60/773 |
| 2015/0345403 | A1 | * | 12/2015 | Cai | F02C 9/00 701/100 |
| 2016/0053702 | A1 | * | 2/2016 | Nada | F02D 41/403 123/294 |
| 2016/0069264 | A1 | * | 3/2016 | Brostmeyer | F02C 7/143 60/39.182 |
| 2016/0160864 | A1 | * | 6/2016 | Becquin | F02C 7/12 60/645 |
| 2016/0169095 | A1 | * | 6/2016 | Kim | F01N 13/107 60/603 |
| 2016/0208639 | A1 | * | 7/2016 | Cai | F01D 21/003 |
| 2016/0230663 | A1 | * | 8/2016 | Mizukami | F02C 3/13 |
| 2016/0237904 | A1 | * | 8/2016 | Scarboro | F02C 7/143 |
| 2016/0245125 | A1 | * | 8/2016 | Watkins | F01K 11/02 |
| 2016/0258327 | A1 | * | 9/2016 | Klosinski | F01K 23/10 |
| 2017/0122208 | A1 | * | 5/2017 | Kessler | F02C 7/143 |
| 2017/0191375 | A1 | * | 7/2017 | Vela | B08B 9/093 |

OTHER PUBLICATIONS

Alhazmy and Najjar, "Augmentation of gas turbine performance using air coolers," Applied Thermal Engineering 24 (2004) 415-429 (Year: 2004).*

Lilley, "Adiabatic Flame Temperature Calculation: A Simple Approach for General CHONS Fuels," AIAA 2004-817 (Year: 2004).*

Al-Salman, Rishack, Al-Mousawi, "Parametric Study of Gas Turbine Cycle With Fogging System," J.Basrah Researches (Sciences) vol. 33. No. 4. Dec. 16-30, 2007 (Year: 2007).*

Achim Zajc, Thomas Ryll, "Rapid determination of the calorific value by means of a novel gas quality sensor," Heat Processing, Jan. 2017, pp. 61-66. (Year: 2017).*

* cited by examiner

GAS TURBINE LOWER HEATING VALUE METHODS AND SYSTEMS

BACKGROUND

The subject matter disclosed herein relates to gas turbines, and more particularly, to lower heating value methods and systems.

A gas turbine engine combusts a mixture of fuel and air to generate hot combustion gases, which in turn drive one or more turbines. In particular, the hot combustion gases force turbine blades to rotate, thereby driving a shaft to rotate one or more loads, e.g., electrical generator. The fuel used in combustion may be a carbonaceous fuel, such as diesel, natural gas, syngas, biogas, and the like. Accordingly, the fuel may have a variation in heating values. Lower heating value fuels may contain higher levels of inert compounds, thus leading to challenges in combustion. There is a desire, therefore, for a methods and systems that provide for more effective use of lower heating value fuels.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, the disclosure may encompass a variety of forms that may be similar to or different from the embodiments set forth below.

In a first embodiment, a system includes a control system for a gas turbine including a controller having a processor. The processor is configured to receive a plurality of signals comprising a temperature signal, a pressure signal, a speed signal, a mass flow signal, or a combination thereof, from sensors disposed in the gas turbine system. The processor is further configured to apply the plurality of signals as input to a heating value model. The processor is also configured to execute the heating value model to derive a heating value for a fuel combusted by the gas turbine system. The processor is additionally configured to control operations of the gas turbine system based on the heating value for the fuel.

A second embodiment includes a non-transitory computer-readable medium having computer executable code stored thereon, the code having instructions to receive a plurality of signals comprising a temperature signal, a pressure signal, a speed signal, a mass flow signal, or a combination thereof, from sensors disposed in the gas turbine system. The instructions are further configured to apply the plurality of signals as input to a heating value model. The instructions are also configured to execute the heating value model to derive a heating value for a fuel combusted by the gas turbine system. The instructions are additionally configured to control operations of the gas turbine system based on the heating value for the fuel.

In a third embodiment, a method for a gas turbine system includes receiving a plurality of signals comprising a temperature signal, a pressure signal, a speed signal, a mass flow signal, or a combination thereof, from sensors disposed in the gas turbine system. The method also includes applying the plurality of signals as input to a heating value model. The method further includes executing the heating value model to derive a heating value for a fuel combusted by the gas turbine system. The method additionally includes controlling operations of the gas turbine system based on the heating value for the fuel.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure is directed towards a system and method to derive heating values of, for example, fuel delivered to a gas turbine system, and then apply the derived heating values to improve control of the gas turbine system. In certain embodiments, a gas turbine controller may include a heating value derivation system (HVDS) suitable for receiving certain inputs, such as temperature, pressure, speed (e.g., revolutions per minute [RPM]), clearances (e.g., distance between a moving and a stationary component), flows, mass flows, and the like, to derive, for example, a heating value of fuel used for combustion by the gas turbine. In one embodiment, a heating value model, such as a low heating value (LHV) model, may be used by the HVDS to model certain turbine parameters and to derive a heating value for low heating value fuels, as described in more detail below. The derivations provided by the LHV model may then be used, for example by the controller, to derive certain control actions suitable for improving efficiency, power production, and/or lowering emissions of the gas turbine system.

Figure 1:
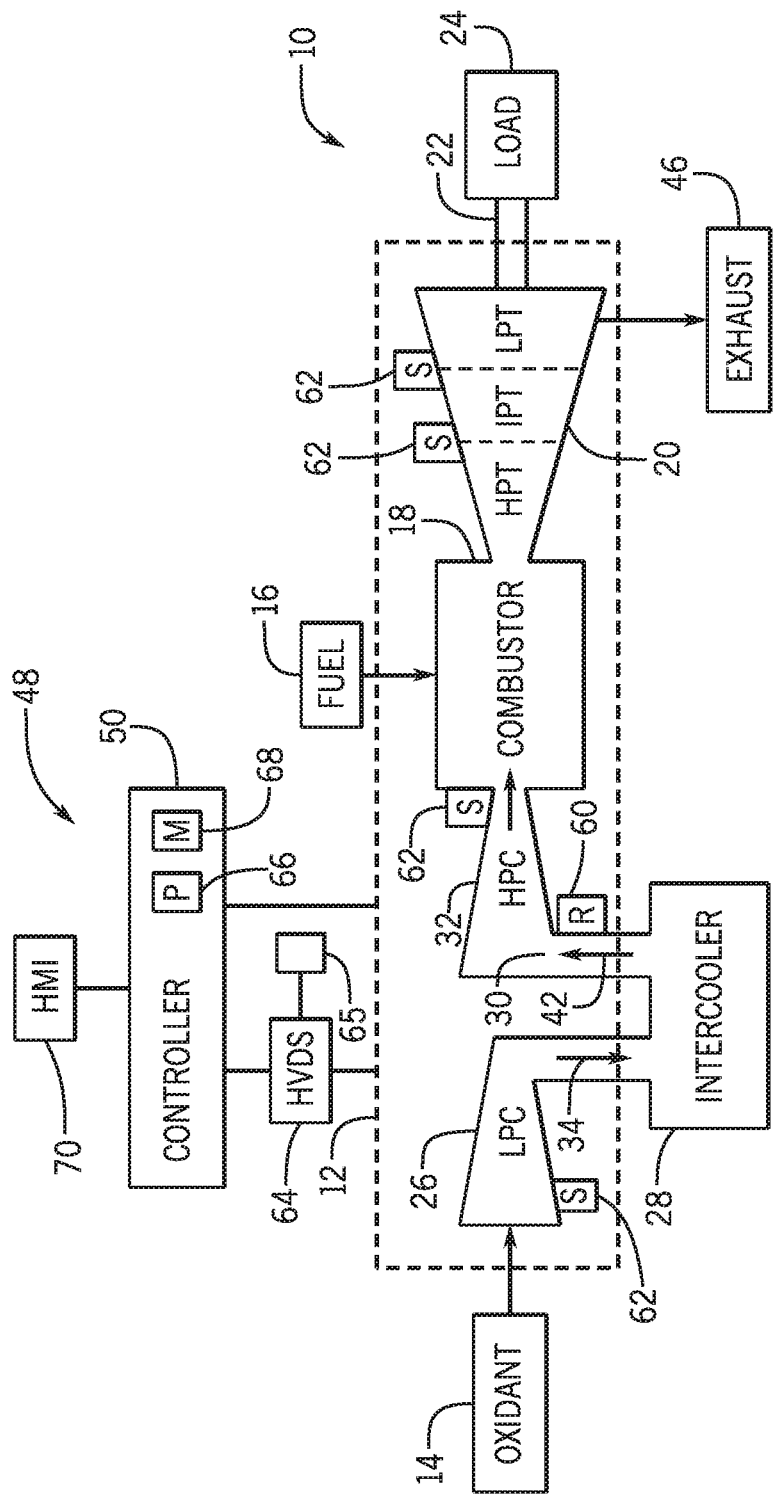
FIG. 1 is a schematic diagram of an embodiment of a power generation system having a low heating value derivation system.

Turning to the figures, FIG. 1 is a schematic diagram of an embodiment of a power generation system 10 that includes a gas turbine system 12. The gas turbine system 12 may receive an oxidant 14 (e.g., air, oxygen, oxygen-enriched air, or oxygen-reduced air) and a fuel 16 (e.g., gaseous or liquid fuel), such as natural gas, syngas, or petroleum distillates. The oxidant 14 may be pressurized and combined with the fuel 16 to be combusted in a combustor 18. The combusted oxidant may then be used to apply forces to blades of a turbine 20 to rotate a shaft 22 that provides power to a load 24 (e.g., electric generator). In one embodiment, the power generation system 10 may be a dry low emission (DLE) that includes the gas turbine 12 suitable for reducing nitrogen oxide (NOx) emissions, for example, by combusting the fuel 16 at lower temperatures. In DLE embodiments, the gas turbine 16 may use a lean premixed combustion as opposed to water or steam to reduce combustion temperature. Accordingly, power generation may occur with less fuel and oxidant (e.g., air), resulting in lower temperatures and lower NOx emissions.

The gas turbine system 12 may include one or more compressors that increase the pressure of the oxidant 14. As depicted in FIG. 1, the gas turbine system 12 includes a lower pressure compressor (LPC) 26 connected to an intercooler 28 to couple the lower pressure compressor 26 to an inlet 30 of a high pressure compressor (HPC) 32. The oxidant 14 enters the low pressure compressor 26 and is compressed into a compressed oxidant 34 (e.g., gas, liquid, or both). The compressed oxidant 34 may include a compressed gas (e.g., air, oxygen, oxygen-enriched air, or oxygen-reduced air), a lubricant (e.g., oil), a coolant fluid, or any combination thereof. In certain embodiments, the compressed oxidant 34 may include gas from exhaust gas recirculation (EGR). The compressed oxidant 34 then enters the intercooler 28. It is to be noted that, in some embodiments of the system 10, no intercooler 28 is used.

The intercooler 28 may be any intercooler 28 suitable for cooling the compressed oxidant 34, such as a spray intercooler (SPRINT) or an efficient spray intercooler (ES-PRINT). The intercooler 28 may cool the compressed oxidant 34 by using a fluid to increase the efficiency of the gas turbine system 12. The compressed and cooled oxidant 42 is further compressed in the high pressure compressor 32 and combined with the fuel 16 into an oxidant-fuel mixture to be combusted in the combustor 18. As the oxidant-fuel mixture is combusted (e.g., burned and/or ignited), the oxidant-fuel mixture expands through one or more turbines 20. For example, embodiments may include a high pressure turbine (HPT), intermediate pressure turbine (IPT), and a low pressure turbine (LPT) as depicted in FIG. 1. In some embodiments, the system 10 may include HPT and LPT turbines. In other embodiments, there may be a single turbine, four, five, or more turbines.

The turbine 20 may be coupled to a shaft 22 that is coupled to one or more loads 24. The turbine 20 may include one or more turbine blades that rotate causing the shaft 22 to provide rotational energy to the load 24. For example, the load 24 may include an electrical generator or a mechanical device in an industrial facility or power plant. The rotational energy of the shaft 22 may be used by the load 24 to generate electrical power. As the gas turbine system 12 generates power, the combusted oxidant-fuel mixture is expelled as an exhaust 46. The exhaust 46 may include one or more emissions, such as nitrogen oxides (NOx), hydrocarbons (HC), carbon monoxide (CO) and/or other pollutants. The exhaust 46 may be treated in a variety of ways, such as with a catalyst system.

The power generation system 10 may also include a control system 48 to monitor and/or control various aspects of the gas turbine system 12, the load 24, and/or the intercooler 28. The control system 48 may include a controller 50 having inputs and/or outputs to receive and/or transmit signals to one or more actuators 60, sensors 62, or other controls to control the gas turbine system 12 and/or the intercooler 28. While some examples are illustrated in FIG. 1 and described below, these are merely examples and any suitable sensors and/or signals may be positioned on the gas turbine system 12, the load 24, and/or the intercooler 28 to detect operational parameters to control the power generation system 10 with the controller 50. For example, the controller 50 may send and/or receive a signal from one or more actuators 60 and sensors 62 to control any number of aspects of the system 10, including fuel supply, speed, oxidant delivery, power production, and so forth. For example, actuators 60 may include valves, positioners, pumps, and the like. The sensors 62 may sense temperature, pressure, speed, clearances (e.g., distance between a stationary and a moving component), flows, mass flows, and the like.

Further, the controller 50 may include and/or communicate with a heating value derivation system 64. The heating value derivation system 64 may calculate a heating value of the fuel 16 being used, for example, during power production. The heating value derivation system 64 may be used as an alternative to or in addition to certain systems, such as gas chromatographs and/or Wobbe meters. For example, when used as an alternative to gas chromatographs and/or Wobbe meters, the heating value derivation system 64 may provide for faster derivations of heating values useful in real-time control of the power production system 10. When used in addition to gas chromatographs and/or Wobbe meters, the heating value derivation system 64 may provide for additional system robustness and increased accuracy. For example, redundancy may be provided by having an additional source of heating values such as the system 64, and checks may be carried out by the system 64 to insure the accuracy of the gas chromatographs and/or Wobbe meters.

The heating value derivation system 64 may additionally execute a low heating value (LHV) model 65 suitable for determining low heating values of certain fuels 16. For example, the DLE gas turbine 12 may combust certain fuels 16 having lower heating values, such as fuels having Wobbe numbers in a range between 30-60. Indeed, the heating value derivation system 64 may apply the model 65 to derive the heating values of a variety of fuels 16, including lower heating values fuel 16, during operation of the gas turbine 12. Thus, the control system 48 may be suitable for controlling gas turbine 12 operations with a variety of fuels 16, including lower heating value fuels 16, thus providing for enhanced fuel flexibility. It is to be understood that the heating value derivation system 64 may be a software and/or hardware component of the controller 50, or may be a standalone system. For example, a computing device separate from the controller 50 may host the heating value derivation system 64.

The controller 50 may include a processor 66 or multiple processors, memory 68, and inputs and/or outputs to send and/or receive signals from the one or more sensors 62 and/or actuators 60. The processor 66 may be operatively coupled to the memory 68 to execute instructions for carrying out the presently disclosed techniques. These instructions may be encoded in programs or code stored in a tangible non-transitory computer-readable medium, such as the memory 68 and/or other storage. The processor 66 may be a general purpose processor, system-on-chip (SoC) device, or application-specific integrated circuit, or some other processor configuration. For example, the processor 66 may be part of an engine control unit that controls various aspects of the turbine system 12.

Memory 68 may include a computer readable medium, such as, without limitation, a hard disk drive, a solid state drive, a diskette, a flash drive, a compact disc, a digital video disc, random access memory (RAM), and/or any suitable storage device that enables processor 66 to store, retrieve, and/or execute instructions and/or data. Memory 68 may further include one or more local and/or remote storage devices. Further, the controller 50 may be operably connected to a human machine interface (HMI) 70 to allow an operator to read measurements, perform analysis, and/or adjust set points of operation. In one embodiment, the controller 50 may include a triple modular redundant (TMR) controller having three cores, R, S, T, such that each core votes on control actions. By voting, the controller 50 may provide for increased redundancy of control operations.

Figure 2:
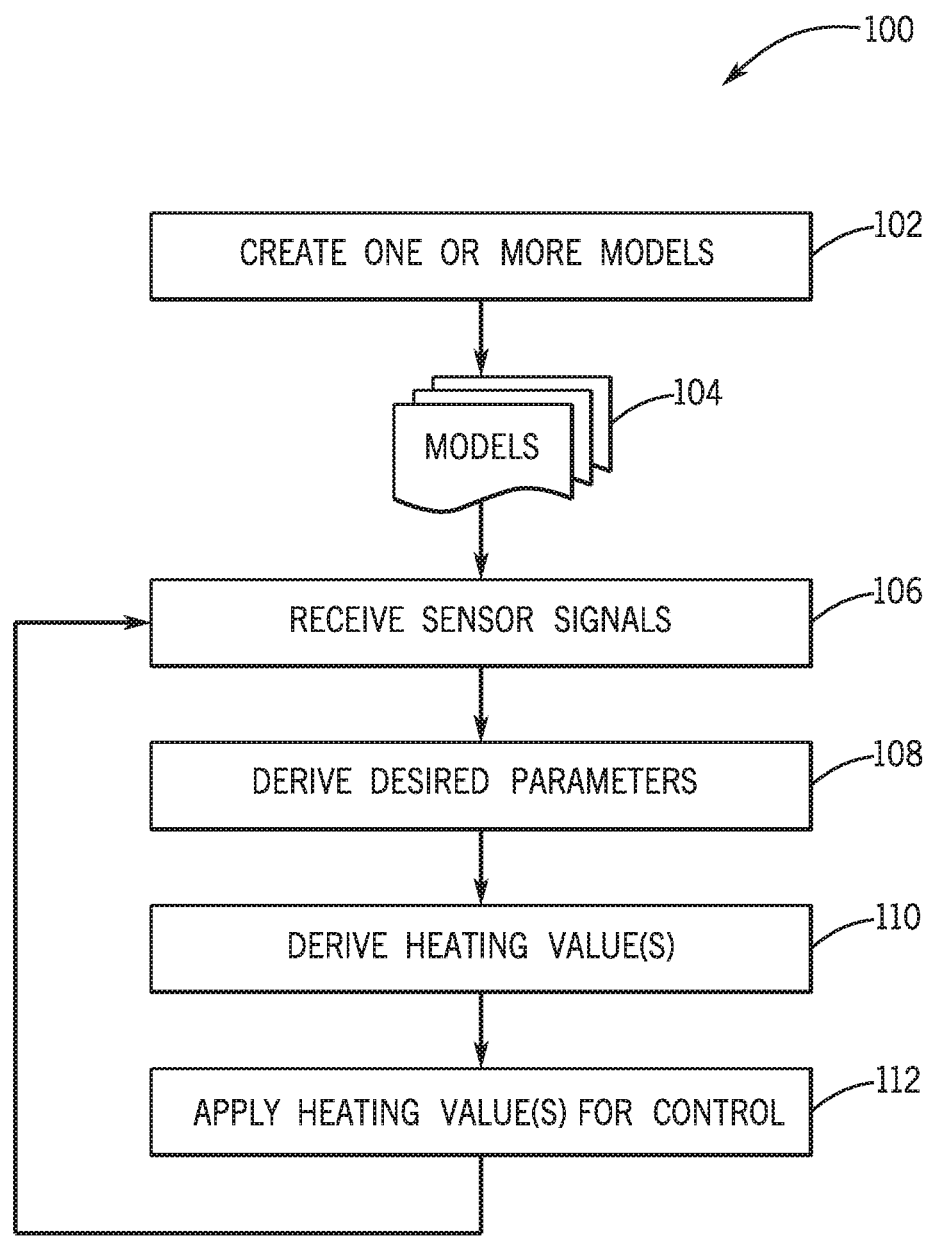
FIG. 2 is a flowchart of a process suitable for deriving certain heating values.

Turning now to FIG. 2, the figure illustrates and example of a process 100 suitable for deriving certain heating values of the fuel 16 and for controlling operations of the power generation system 10 based on the derived heating values. The process 100 may be implemented as computer code or instructions executable by the processor 66 and stored in memory 68. In the depicted embodiment, the process 100 create (block 102) certain models 104, such as heating values models that include the low heating value model 65. For example, the LHV model 65 may be created by combining one or more of the submodels 104. In one embodiment, the LHV model 65 may include the following equation:

$$LHV = (HFL*(WAR36+FAR+1.0)-H3/FAR)-C \quad \text{Equation (1):}$$

In one embodiment, the constant C may be, for example, 283.575. HFL may include an enthalpy value of fuel, for example, derived by using an enthalpy lookup table. Likewise, H3 is an enthalpy value that may be derived by using an enthalpy lookup table. WAR36 is a value representative of mass air flow into the combustor 18, which may be calculated by air flow sensor(s) 62 disposed in a compressor manifold. Fuel-air-ratio (FAR) may be derived based on the equation:

$$FAR = (WF36DMD/3600)/WA4Model. \quad \text{Equation (2):}$$

WF36DMD represents a current fuel 16 and/or oxidant (e.g., air) demand. WA4Model is a model that derives an expected air flow at the combustor 18. In one embodiment, the WA4Model derives the expected air flow at the combustor 18 by using an airflow lookup table. PS3 is pressure at exhaust of the HPC 32. N25 is speed of the HPC 32 (e.g., in revolutions per minute [RPM]). T48 is temperature at an inlet of the low pressure turbine (LPT). A temperature lookup table maps T48 to combustor temperature TFLAME. Using another table you can map TFLAME to enthalpy.

The process 100 may receive (block 106) signals or data from the sensors 62 representative of pressures, temperatures, flows, mass flows, and the like. The process 100 may then derive (block 108) certain desired parameters, such as HFL, WF36, FAR, and H3. The process 100 may then use the derived parameter to derive (block 110) a heating value or values, such as by using the LHV equation above. In embodiments without the gas chromatographs and Wobbe meters, the LHV may be used as further described below, for control of the power generation system 10. In power generation system 10 embodiments that include systems such as gas chromatographs and/or Wobbe meters, the process 100 may derive multiple heating values, for example, one based on the LHV equation above, one based on the gas chromatographs, and one based on the Wobbe meter. The multiple heating values may then be compared to each other, and/or averaged to provide for redundant operations.

The process 100 may then apply (block 112) the heating values derived in block 110, for example, to control operations of the power generation system 10. For example, based on the derived LHV, the fuel 16 flow may be increased or decreased to maintain a desired combustion temperature. For example, fuels with a lower LHV may be combusted at a higher fuel flow when compared to fuels with a higher LHV. By deriving the fuel's heating value, an improved combustion may be produced, resulting in lower NOx emissions.

Figure 3:
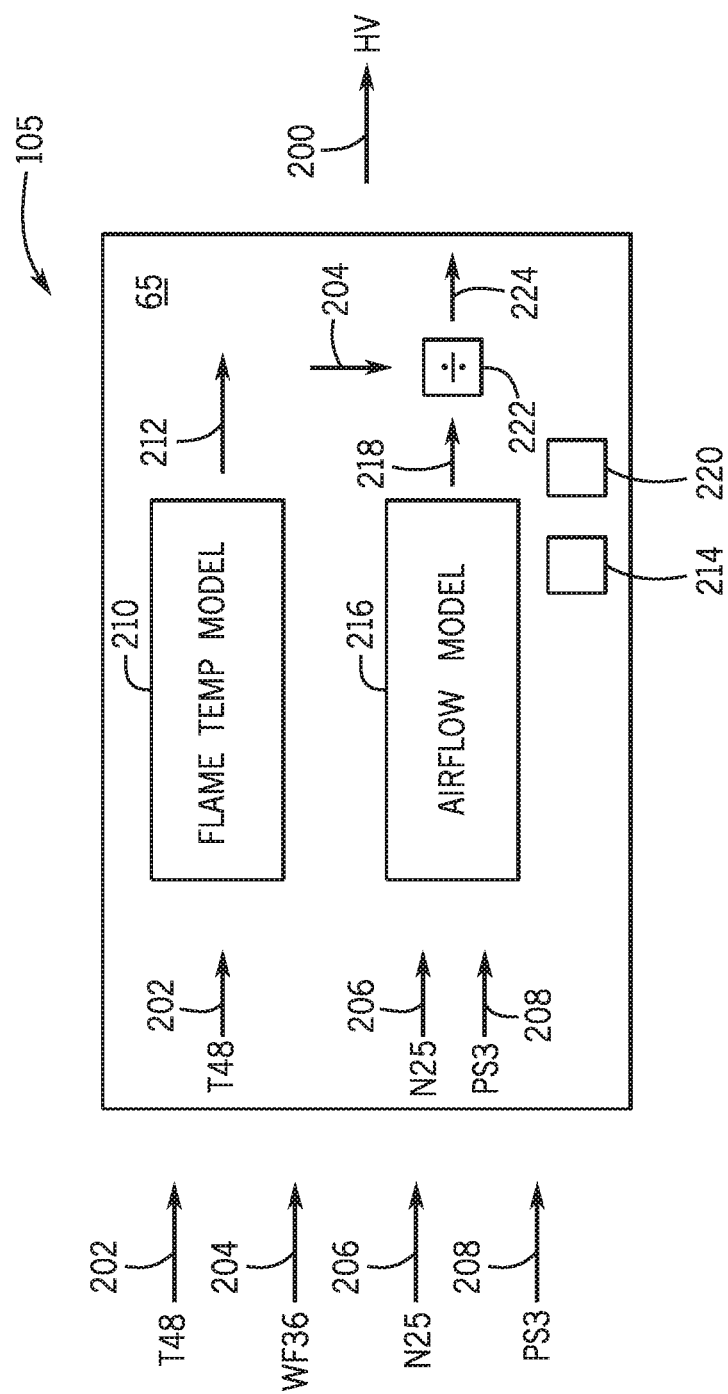
FIG. 3 is a block diagram illustrating certain information flows into and heating value model.

Turning now to FIG. 3, the figure is a block diagram illustrating certain information flows into the models 104. The models 104 may use the information flow to derive heating values 200 for the fuel 16. In the depicted embodiment, input parameters 202, 204, 206, and 208 representative of temperature (e.g., T48), fuel flow (e.g., WF36) at combustor 18, speed (e.g., N25), and pressure (e.g., PS3) may be provided to the models 104. In the depicted embodiment, a flame temperature model 210 may be used to derive a combustor 18 flame temperature 212. In one embodiment, a temperature lookup table 214 may be used to map the temperature parameter 202 (e.g., T48) to the combustor 18 flame temperature 212. In other embodiments, a physics-based model suitable for modeling the combustor 18, for example, via thermodynamic techniques, may be used as an alternative or additional to the table 214 to derive the combustor 18 flame temperature 212.

The models 104 may additionally include an airflow model 216 suitable for converting speed 206 (e.g., N25) and pressure 208 (e.g., PS3) into an expected combustor 18 airflow 218. In one embodiment, the airflow model 216 may apply an airflow lookup table 220 to map both the speed 206 and the pressure 208 to the expected airflow 218. In other embodiments, a physics-based model suitable for modeling the combustor 18, for example, via thermodynamic techniques, may be used as an alternative or additional to the table 220 to derive the combustor 18 airflow 218.

In the depicted embodiment, the model 65 may then derive a difference (e.g., percent difference) between the expected airflow 218 and the measured airflow 204, for example, via a division block 222. An adjusted fuel-air-ratio (FAR) 224 may thus be derived. The model 65 may then apply the adjusted fuel-air-ratio 224 and the combustor 18 flame temperature 212 to derive the heating value 200 (e.g., LHV). In one embodiment, Equations 1 and 2 above described with respect to FIG. 2 may be may be used to derive the heating value 200. More specifically, FAR of Equation (1) may be equivalent to the fuel-air-ratio 224, WA4Model may be equivalent to the airflow 218, and the enthalpies HFL and H3 may be calculated by using the flame temperature 212. Accordingly, the LHV 200, in this embodiment, may be derived.

Technical effects of the present embodiments may include executing a control for a gas turbine combusting a low heating value fuel by using a low heating value model in lieu of or as alternative to using a heating value sensor such as a Wobbe meter or a gas chromatograph. The low heating value model may take as input certain gas turbine properties such as temperature, mass flow, speed, and/or pressure, and provide for a derivation of a heating value of a low heating value fuel. The model may execute in real-time, thus improving control and efficiency for the gas turbine.

This written description uses examples to disclose the embodiments, including the best mode, and also to enable any person skilled in the art to practice the embodiments, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A control system for a gas turbine system, comprising:
a controller comprising a processor, wherein the processor is configured to:
receive a plurality of signals comprising a temperature signal, a pressure signal, a speed signal and a mass flow signal from sensors disposed in the gas turbine system;
execute a heating value model to derive a Lower Heating Value (LHV) for a gas turbine fuel combusted by the gas turbine system, using the plurality of signals as input to the heating value model;
control operations of the gas turbine system based on the LHV derived via the heating value model, wherein the heating value model comprises at least one LHV dynamic equation configured to use as input at least a plurality of enthalpy values, a fuel-to-air ratio and a value for sensed mass air flow into a combustor, wherein the LHV dynamic equation comprises LHV=(HFL*(WAR36+FAR+1.0)−H3/FAR)−C, wherein HFL comprises a first enthalpy of the gas turbine fuel having a range of between 30 to 60 Wobbe numbers, FAR comprises the fuel-to-air ratio, H3 comprises a second enthalpy, C comprises a constant, and WAR36 comprises the value for sensed mass air flow into the combustor and sensed via the mass flow signal.

2. The control system of claim 1, wherein the processor is configured to use a first lookup table and a combustion flame temperature to derive HFL and a second lookup table and the combustion flame temperature to derive H3.

3. The control system of claim 1, wherein FAR is derived via FAR=(WF36DMD/3600)/WA4Model, wherein WF36DMD comprises a current demand for the gas turbine fuel, for air, or for a combination thereof, and wherein WA4Model comprises an airflow model configured to receive the speed signal and the pressure signal to derive an expected airflow by using a lookup table.

4. The control system of claim 1, wherein the gas turbine fuel comprises a LHV fuel and wherein the controller is configured to control operations of the gas turbine system by comparing the LHV to a heating value range, and by increasing fuel flow when the LHV is below the heating value range, and by decreasing fuel flow when the LHV is above the range.

5. The control system of claim 1, wherein the plurality of signals comprises a fuel heating value signal derived via a gas chromatograph or a Wobbe meter, and wherein the LHV is compared to a second LHV derived from the fuel heating value signal to provide for redundant operations.

6. The control system of claim 1, wherein the gas turbine system comprises a spray intercooler (SPRINT) or an efficient spray intercooler (ESPRINT) configured to cool a compressed oxidant using a fluid, and wherein the controller is configured to control the SPRINT or the ESPRINT.

7. A non-transitory computer-readable medium having computer executable code stored thereon, the computer executable code comprising instructions to:
receive a plurality of signals comprising a temperature signal, a pressure signal, a speed signal and a mass flow signal from sensors disposed in a gas turbine system;
execute a heating value model to derive a Lower Heating Value (LHV) for a gas turbine fuel combusted by the gas turbine system, using the plurality of signals as input to the heating value model;
control operations of the gas turbine system based on the LHV derived via the heating value model, wherein the heating value model comprises at least one LHV dynamic equation configured to use as input at least a plurality of enthalpy values, a fuel-to-air ratio and a value for sensed mass air flow into a combustor, wherein the LHV dynamic equation comprises LHV=(HFL*(WAR36+FAR+1.0)−H3/FAR)−C, wherein HFL comprises a first enthalpy of the gas turbine fuel having a range of between 30 to 60 Wobbe numbers, FAR comprises the fuel-to-air ratio, H3 comprises a second enthalpy, C comprises a constant, and WAR36 comprises the value for sensed mass air flow into the combustor and sensed via the mass flow signal.

8. The non-transitory computer-readable medium of claim 7, comprising instructions configured to use a first lookup table and the combustion flame temperature to derive HFL and a second lookup table and the combustion flame temperature to derive H3.

9. The non-transitory computer-readable medium of claim 7, wherein FAR is derived via FAR=(WF36DMD/3600)/WA4Model, wherein WF36DMD comprises a current demand for the gas turbine fuel, for air, or for a combination thereof, and wherein WA4Model comprises an airflow model configured to receive the speed signal and the pressure signal to derive an expected airflow by using a lookup table.

10. The non-transitory computer-readable medium of claim 7, wherein the gas turbine fuel comprises a LHV fuel and wherein the controller is configured to control operations of the gas turbine system by comparing the LHV to a heating value range, and by increasing fuel flow when the LHV is below the heating value range, and by decreasing fuel flow when the LHV is above the range.

11. The non-transitory computer-readable medium of claim 7, wherein the plurality of signals comprises a fuel heating value signal derived via a gas chromatograph or a Wobbe meter, and wherein the LHV is compared to a second LHV derived from the fuel heating value signal to provide for redundant operations.

12. A method for a gas turbine system, comprising:
receiving a plurality of signals comprising a temperature signal, a pressure signal, a speed signal and a mass flow signal from sensors disposed in the gas turbine system;
executing a heating value model to derive a Lower Heating Value (LHV) for a gas turbine fuel combusted by the gas turbine system, using the plurality of signals as input to the heating value model;
controlling operations of the gas turbine system based on the LHV derived via the heating value model, wherein the heating value model comprises at least one LHV dynamic equation configured to use as input at least a plurality of enthalpy values, a fuel-to-air ratio and a value for sensed mass air flow into a combustor, wherein the LHV dynamic equation comprises LHV=(HFL*(WAR36+FAR+1.0)−H3/FAR)−C, wherein HFL comprises a first enthalpy of the gas turbine fuel having a range of between 30 to 60 Wobbe numbers, FAR comprises the fuel-to-air ratio, H3 comprises a second enthalpy, C comprises a constant, and WAR36 comprises the value for sensed mass air flow into the combustor and sensed via the mass flow signal.

13. The method of claim 12, comprising using a first lookup table and the combustion flame temperature to derive HFL and a second lookup table and the combustion flame temperature to derive H3.

14. The method of claim 12, wherein FAR is derived via FAR=(WF36DMD/3600)/WA4Model, wherein WF36DMD comprises a current demand for the gas turbine fuel, for air, or for a combination thereof, and wherein WA4Model comprises an airflow model configured to receive the speed signal and the pressure signal to derive an expected airflow by using a lookup table.

\* \* \* \* \*